(12) United States Patent
Heeter (10) Patent No.: US 10,990,841 B2
(45) Date of Patent: Apr. 27, 2021

(54) ELECTRONIC SALES METHOD

(76) Inventor: Thomas W. Heeter, Corning, CA (US)

( * ) Notice: Subject to any disclaimer, the term of this patent is extended or adjusted under 35 U.S.C. 154(b) by 0 days.

(21) Appl. No.: 13/509,041

(22) PCT Filed: Nov. 17, 2010

(86) PCT No.: PCT/US2010/002986
§ 371 (c)(1),
(2), (4) Date: May 10, 2012

(87) PCT Pub. No.: WO2011/062617
PCT Pub. Date: May 26, 2011

(65) Prior Publication Data
US 2012/0223137 A1      Sep. 6, 2012

Related U.S. Application Data

(63) Continuation of application No. 12/590,940, filed on Nov. 17, 2009, now Pat. No. 8,483,448.

(51) Int. Cl.
*G06K 9/03*       (2006.01)
*G06Q 20/40*      (2012.01)
(Continued)

(52) U.S. Cl.
CPC .......... *G06K 9/036* (2013.01); *G06Q 20/382* (2013.01); *G06Q 20/40* (2013.01); *G06Q 30/06* (2013.01);
(Continued)

(58) Field of Classification Search
USPC ........................................................ 235/380
See application file for complete search history.

(56) References Cited

U.S. PATENT DOCUMENTS

| 3,584,958 A | 6/1971 | Miller et al. |
| 3,944,978 A | 3/1976 | Jenson et al. |

(Continued)

FOREIGN PATENT DOCUMENTS

WO    WO2006053122 A2    5/2006

OTHER PUBLICATIONS

Hussmann, Prof. Dr. Heinrich, "Multimedia im Netz, 7 Electronic Payment Systems," Ludwig Maximilian University of Munich, http://www.medien.ifi.lmu.de/lehre/ws0910/mmn/mmn7.pdf—date unknown.

(Continued)

*Primary Examiner* — Michael G Lee
*Assistant Examiner* — David Tardif
(74) *Attorney, Agent, or Firm* — John R Casperson (57) ABSTRACT

Methods are presented for facilitating sales transactions by electronic media A temporary barcode or other design is affixed to the person or personal object during the period of time for which a financial transaction might occur. Before the sales transaction can be consummated, the barcode information is scanned and characteristics about the scanned code are compared to characteristics about other codes stored in a database for the specific time period in question in order to verify the identity of the buyer for a given time period. Once the information is verified, the seller may be authorized to debit the buyer's electronic bank account or charge their charge card account to consummate the transaction or transactions during a period of time. The seller may transmit the buyer's barcode and the buyer transmit the seller's barcode to a clearance center, where the buyer has a smartphone capable of scanning the seller's code.

8 Claims, 5 Drawing Sheets (51) Int. Cl.
  *G06Q 20/38* (2012.01)
  *G07G 1/00* (2006.01)
  *G06Q 30/06* (2012.01)
  *G06K 9/00* (2006.01)
  *G06Q 50/26* (2012.01)

(52) U.S. Cl.
  CPC ....... *G07G 1/0045* (2013.01); *G06K 9/00013* (2013.01); *G06K 9/00221* (2013.01); *G06Q 50/265* (2013.01)

(56) References Cited

U.S. PATENT DOCUMENTS

| | | |
|---|---|---|
| 4,597,495 A | 7/1986 | Knosby |
| 4,805,223 A | 2/1989 | Denyer |
| 4,995,086 A | 2/1991 | Lilley et al. |
| 5,509,070 A | 4/1996 | Schull |
| 5,602,377 A | 2/1997 | Beller et al. |
| 5,633,947 A | 5/1997 | Sibbald |
| 5,878,155 A | 3/1999 | Heeter |
| 5,917,928 A | 6/1999 | Shpuntov et al. |
| 6,424,249 B1 | 7/2002 | Houvener |
| 6,470,891 B2 | 10/2002 | Carroll |
| 6,615,191 B1 | 9/2003 | Seeley |
| 6,998,997 B2 | 2/2006 | Stevenson et al. |
| 7,136,814 B1 | 11/2006 | McConnell |
| 7,158,955 B2 | 1/2007 | Diveley |
| 7,194,430 B2 | 3/2007 | Von Holm et al. |
| 7,267,279 B2 | 9/2007 | Melick et al. |
| 7,283,977 B1 | 10/2007 | Tyson-Quah |
| 7,296,004 B1 | 11/2007 | Garrison et al. |
| 7,319,978 B2 | 1/2008 | Minamishin et al. |
| 7,322,529 B2 | 1/2008 | Behm et al. |
| 7,356,507 B2 | 4/2008 | Bezos et al. |
| 7,407,094 B2 | 8/2008 | Myers et al. |
| 7,433,844 B2 | 10/2008 | Laskowski |
| 7,451,115 B2 | 11/2008 | Silverbrook et al. |
| 7,464,880 B2 | 12/2008 | Silverbrook et al. |
| 7,475,808 B1 | 1/2009 | Bishop |
| 7,478,066 B2 | 1/2009 | Remington et al. |
| 7,493,190 B1 | 2/2009 | Tomassi |
| 7,499,875 B1 | 3/2009 | May et al. |
| 7,500,616 B2 | 3/2009 | Beenau et al. |
| 7,506,818 B2 | 3/2009 | Beenau et al. |
| 7,536,326 B2 | 5/2009 | Tyson-Quah et al. |
| 7,536,347 B2 | 5/2009 | Tyson-Quah et al. |
| 7,537,153 B2 | 5/2009 | Hurwitz et al. |
| 7,546,954 B2 | 6/2009 | Longacre, Jr. et al. |
| 7,571,140 B2 | 8/2009 | Weichert et al. |
| 7,587,342 B2 | 9/2009 | Neofytides et al. |
| 7,593,899 B1 | 9/2009 | Silverbrook et al. |
| 7,611,065 B2 | 11/2009 | Behm et al. |
| 7,617,982 B1 | 11/2009 | Herwig et al. |
| 7,720,718 B2 * | 5/2010 | Hale .............. G06Q 30/02 705/26.9 |
| 7,734,546 B2 | 6/2010 | Allin et al. |
| 7,769,599 B2 | 8/2010 | Yanak et al. |
| 7,792,688 B2 | 9/2010 | Yanak et al. |
| 7,793,829 B2 | 9/2010 | Randazza et al. |
| 7,810,720 B2 * | 10/2010 | Lovett ............ G06Q 20/385 235/380 |
| 7,815,117 B2 * | 10/2010 | Tuschel ........... G06K 19/10 235/462.01 |
| 7,841,523 B2 | 11/2010 | John et al. |
| 7,878,404 B2 | 2/2011 | Napper et al. |
| 7,891,547 B2 | 2/2011 | Silverbrook et al. |
| 7,891,563 B2 | 2/2011 | John et al. |
| 7,917,432 B2 | 3/2011 | Cortion et al. |
| 7,922,083 B2 | 4/2011 | Harrison et al. |
| 7,946,493 B2 | 5/2011 | Havens et al. |
| 7,953,642 B2 | 5/2011 | Dierks |
| 7,953,664 B2 | 5/2011 | Jung et al. |
| 7,966,267 B2 | 6/2011 | Auslander et al. |
| 8,051,452 B2 | 11/2011 | Arseneau et al. |
| 8,121,945 B2 | 2/2012 | Rackley, III et al. |
| 8,157,173 B2 | 4/2012 | Melick et al. |
| 8,160,959 B2 | 4/2012 | Rackley, III et al. |
| 8,249,965 B2 | 8/2012 | Tumminaro |
| 8,364,590 B1 | 1/2013 | Casey et al. |
| 8,467,766 B2 | 6/2013 | Rackley, III et al. |
| 8,483,448 B2 | 7/2013 | Heeter |
| 8,515,874 B2 | 8/2013 | Blair et al. |
| 8,596,527 B2 | 12/2013 | Bishop et al. |
| 8,612,343 B2 | 12/2013 | Bezos et al. |
| 8,646,685 B2 | 2/2014 | Bishop et al. |
| 8,662,384 B2 | 3/2014 | Dodin |
| 8,794,509 B2 | 8/2014 | Bishop et al. |
| 8,825,545 B2 | 9/2014 | Grinberg et al. |
| 2004/0026501 A1 | 2/2004 | Walsh |
| 2006/0265326 A1 | 11/2006 | Barrett |
| 2007/0005685 A1 | 1/2007 | Chau et al. |
| 2007/0011104 A1 | 1/2007 | Leger et al. |
| 2007/0057043 A1 | 3/2007 | Ortega et al. |
| 2007/0150411 A1 | 6/2007 | Addepalli et al. |
| 2007/0150414 A1 | 6/2007 | Templeton |
| 2007/0168282 A1 | 6/2007 | Giordano |
| 2007/0198408 A1 | 8/2007 | Beer |
| 2007/0244811 A1 | 10/2007 | Tumminaro |
| 2007/0255620 A1 | 11/2007 | Tumminaro et al. |
| 2007/0272739 A1 | 11/2007 | Randazza et al. |
| 2007/0282690 A1 | 12/2007 | Randazza et al. |
| 2008/0010191 A1 | 1/2008 | Rackley, III et al. |
| 2008/0010204 A1 | 1/2008 | Rackley, III et al. |
| 2008/0052176 A1 | 2/2008 | Buchheit |
| 2008/0052208 A1 | 2/2008 | Neece et al. |
| 2008/0086413 A1 | 4/2008 | Malloy et al. |
| 2008/0086417 A1 | 4/2008 | Bykov et al. |
| 2008/0167017 A1 | 7/2008 | Wentker et al. |
| 2008/0172331 A1 | 7/2008 | Graves et al. |
| 2008/0189208 A1 | 8/2008 | Wilkie |
| 2008/0195536 A1 | 8/2008 | Karns et al. |
| 2008/0203167 A1 | 8/2008 | Soule et al. |
| 2008/0222048 A1 | 9/2008 | Higgens et al. |
| 2008/0243685 A1 | 10/2008 | Antoo |
| 2008/0270301 A1 | 10/2008 | Jones et al. |
| 2008/0275760 A1 * | 11/2008 | Easterly .............. G06Q 40/12 705/39 |
| 2009/0039150 A1 | 2/2009 | Lay |
| 2009/0070273 A1 | 3/2009 | Moryto |
| 2009/0089193 A1 | 4/2009 | Paintin |
| 2009/0157518 A1 | 6/2009 | Bishop et al. |
| 2009/0157555 A1 | 6/2009 | Biffle et al. |
| 2009/0164324 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164331 A1 | 6/2009 | Bishop et al. |
| 2009/0171797 A1 | 7/2009 | Branca, Jr. |
| 2009/0240598 A1 | 9/2009 | Kargman |
| 2009/0271305 A1 | 10/2009 | Lal et al. |
| 2009/0271327 A1 | 10/2009 | Lal et al. |
| 2009/0281945 A1 | 11/2009 | Shakkarwar |
| 2009/0281951 A1 | 11/2009 | Shakkarwar |
| 2009/0313131 A1 | 12/2009 | Giordano |
| 2010/0051708 A1 | 3/2010 | Behm et al. |

OTHER PUBLICATIONS

Baxter, Irwin Jr.; "666 The Mark of the Beast"; Jan./Feb. 1993; pp. 1-5.

Barnes, David; "Traffic World Back Page Column"; Knight-Rider/Tribune Business News; Jun. 30, 1997; p. 1—cited in related patent U.S. Pat. No. 8,482,448.

* cited by examiner

ELECTRONIC SALES METHOD

TECHNICAL FIELD

The present invention relates to the identification of humans. More particularly, the present invention relates to the use of temporary codes for purposes of identification in order to conduct monetary and credit transactions in a secure manner.

BACKGROUND ART

The disclosure of my earlier patent, U.S. Pat. No. 5,878,155, issued Mar. 2, 1999 is incorporated herein by reference. In U.S. Pat. No. 5,878,155 at column 2, lines 40-42, the possibility employing temporary tattoos for the verification method disclosed therein is disclosed. The present invention in one embodiment provides a further security improvement by employing a series of temporary tattoos, each valid only for a temporary period of time, or, alternatively, a temporary tattoo, label, decal or the like carrying a barcode or the like coupled to an identity confirmation step that employs a buyer's cell phone.

Further, the temporal sequence of the tattoos or barcode markings themselves need not follow any logically sequential pattern, and in fact they ideally would not follow recognizable visual sequence so that random guessing of the next tattoo in the sequence would be virtually impossible for an outsider to do.

DISCLOSURE OF INVENTION

In accordance with one embodiment of the invention, there is provided a method of human identification. The method is carried out by providing identity information for a human in an electronic database, and providing identity information for a plurality of marks in an electronic database, each mark being associated with the identity information for the human in a validating way only for a predetermined time period. The human is then provided with a means for transferring marks which convey the mark identity information to a scanner onto their person or a personal object for use during the predetermined time period. Identification is established or, or more preferably, confirmed, by scanning a mark from a person or personal object, and determining electronically from the databases whether the scanned mark is valid.

In another embodiment, the invention makes use of temporary tattoos to apply the marks. The cost of producing temporary tattoos is much less than the cost of producing magnetic strip debit or credit cards, or high security ID cards, and is easier to change. A person with high security concerns could elect to change tattoos daily, for example, while one with low security concerns could elect to change tattoos monthly. Because a tattoo can immediately be changed in the event of a security breach, risk of loss due to recurring fraudulent charges is reduced. Also, a person who does not wish to participate in the system for say, ethical, moral or religious reasons can elect not to do so, or, in the event of a change of mind, they can cease using it, as the tattoos are not permanent. Finally, permanent tattoos fade and smudge over time, whereas temporary tattoos can be changed with sufficient frequency to remain crisp in appearance and easily scannable.

In another embodiment of the invention there is provided a multiple-payment-option charge card comprising a rectangular card carrying a multiplicity of differing two-dimensional data matrix codes in the form of decals, stamps or stickers, each data matrix code encrypting a buyer's charge or debit card information, or electronically linkable to the buyer's charge or debit card information, the charge or debit card information being different for each code carried by the card. In this embodiment, the one card replaces several, and is referred to hereinafter as a "One Card".

In a further embodiment of the invention, there is provided an electronic method for completing a sales transaction between a buyer having a smartphone and a seller. The buyer's smartphone has a digital camera function, an interactive display, and applications to enable steps of the method that are carried out at the buyer's smartphone. The method is carried out by establishing an amount to be charged for the sales transaction. Buyer data code is then optically captured from the buyer and the buyer data code and the amount to be charged are electronically transmitted to a remote location. At the remote location, the buyer data code is electronically associated with buyer contact information in an electronic database. The contact information includes the buyer's smartphone number. The information representative of the amount to be charged is transmitted to the buyer's smartphone display. The buyer then captures seller data from the seller with the buyer's smartphone camera function and inputs into the smartphone the payment data using the buyer's smartphone display function. This information is then transmitted from the buyer's smartphone to a remote location for processing and approval of payment.

BEST MODE FOR CARRYING OUT THE INVENTION

In accordance with one embodiment of the invention, there is provided a method of human identification. The method is carried out by providing identity information for a human in an electronic database, and providing identity information for a plurality of marks in an electronic database, each mark being associated with the identity information for the human in a validating way only for a predetermined time period. The human is then provided with a means for transferring marks which convey the mark identity information to a scanner onto their person or a personal object for use during the predetermined time period. Identification is established or, or more preferably, confirmed, by scanning a mark from a person or personal object, and determining electronically from the databases whether the scanned mark is valid.

Figure 8:
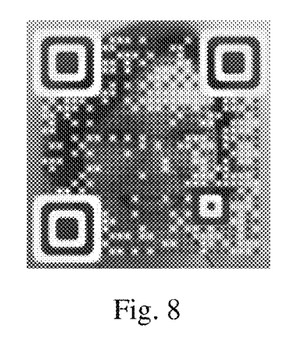
FIG. 8 illustrates a scannable image, comprised of an original image with pixels altered in such a way that scanning the image yields a data string.

Preferably, the scanned mark is signaled valid only if it is associated with the identity information for the human and is scanned during the predetermined time period. In a preferred embodiment, each mark is validly associated with the human identity information for only one of a plurality of predetermined chronological time periods, one mark for each time period, and the time periods are sequential. To provide for correspondence with the database on the user end, the user is provided with means for sequential transfer of a mark for each of the predetermined time periods. For example, the human user can be provided with electronic files for printing the marks on temporary tattoo sheets. The files can be transmitted over the internet, for example, or mailed in hard form. Alternatively, the human can be provided with temporary tattoo sheets carrying the marks in transferrable form thereon. The mark can be in any form that provides an easily changeable data string. For example, a barcode or other scannable design that yields a data string can be employed, as depicted in FIG. 8. Mixtures of dyes fluorescing (or absorbing) at different wavelengths could also be used to form binary codes readable with an appropriate scanner independently of the shape of the mark.

In response to a determination that the scanned mark is valid, a financial transaction for the human can be approved, and a financial account for the human can be debited in the amount of the transaction. As an extra layer of security, which can be triggered in the event that the transaction exceeds a predetermined amount, the identity of the human can be sent from the database to the point of scan for confirmation of identity, by photo-ID for example, or simply a digital image of the presumptive user of the system.

In another embodiment of the invention, identity information about a purchaser and corresponding temporal information about a tattoo or other mark is provided on a storage medium. Temporally arranged adhesive transparency sheets, to allow the printing of the tattoos or designs on the adhesive sheets, are also provided. The sheets are organized in such a way that they can be temporally verified, for example, in calendar form. Marking ink for applying to the adhesive sheets to form tattoos or designs is also provided. The marking ink is applied to the sheets to form the tattoos. Characteristics about the tattoos and corresponding temporal information during which the tattoos are considered valid are stored electronically on storage medium and linked to the identity information about the purchaser to validate use of the tattoos for purchases. Identity confirmation can be provided by transmitting back to the scan point and displaying the name associated in the database with the temporal mark.

Certain embodiments of the invention make use of two-dimensional data matrix codes. These can be utilized in the form of temporary tattoos, or in the form of decals stamps or stickers that can be affixed to a plastic card or other personal object and used to replace debit or credit cards.

Figure 5:
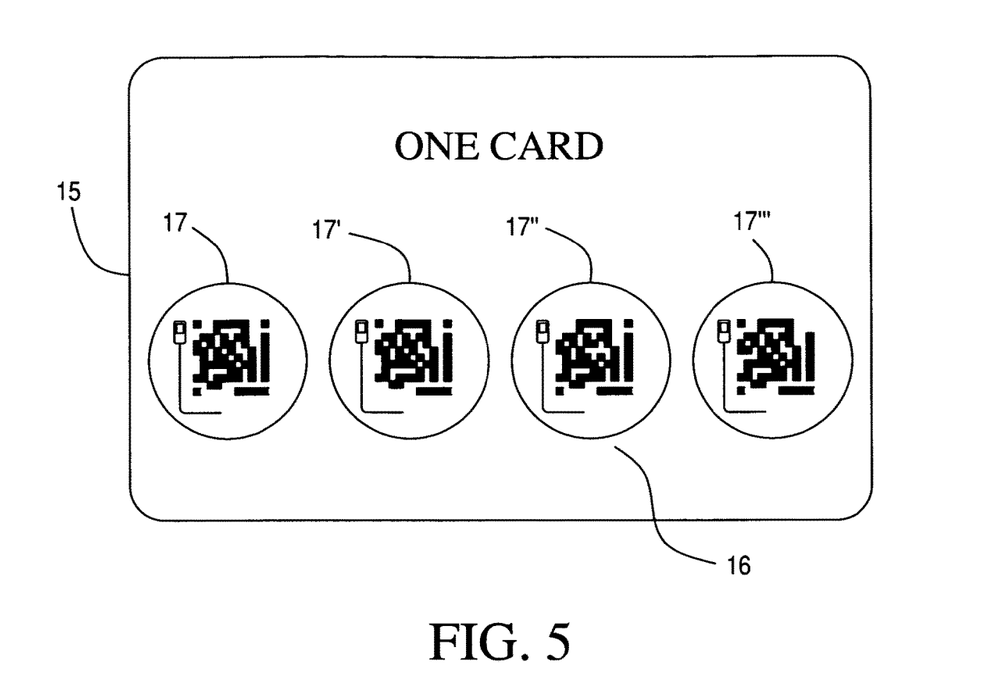
FIG. 5 illustrates a "One Card" in accordance with an embodiment of the invention.

In one embodiment of the invention as shown in FIG. 5, there is provided a multiple payment option charge card 15 comprising a rectangular card carrying a multiplicity of differing two-dimensional data matrix codes 16 in the form of decals, stamps or stickers 17, 17', 17" and 17''', each data matrix code encrypting a buyer's charge card information, the charge card information being different for each code carried by the card. In this embodiment, the one card replaces several, and is referred to hereinafter as a "One Card" Preferably, the decals, stamps or stickers are affixed to the One Card with an adhesive system which permits the decal, stamp or sticker to be peeled intactly from the card without the use of tools. This permits the information to be easily replaced, to reduce the risk of compromise. Generally, the data matrix codes are embodied in a square pattern measuring in the range of from 1 to 30 mm on a side and further encode contact information to enable communication between a seller's scanner and a remote location.

The customer could sign up online, or be part of a targeted mailout, or they could be "auto enrolled" when they receive a payment from an existing Paypal or other electronic payment systems company customer if certain criteria are met. Traditional customers would receive their One Card packages in the mail; in the form of a One Card and a sheet of green PayPal (or equivalent) stickers, each bearing a unique data encryption, plus collateral materials such as instructions.

The customer then can proceed in one of several ways. Option 1 is to text number and receive a URL line to cell phone to download software, which includes an integrated point of sale terminal. Option 2 is for the customer to call a phone number, enter their cell phone number, and receive a URL link text to download scanner software, which includes an integrated point of sale terminal. Option 3 is for the customer to go online to an electronic payment systems company site, such as the PayPal site, download the software, and enroll at the PayPal site. Option 4 is to receive a link to sign up at click thru links from, say Facebook. Another option would be to receive the two-dimensional data matrix codes via a web sign up. The customer could then download and print their own labels.

It is expected that the smartphone itself would manage security by keeping track of location, for example, so that transactions from unusual locations could be flagged for greater scrutiny during the approval process. Another security layer could be provided by instructions to accept transactions only from a certain MAC address, or group of addresses, to limit use of the sticker to a single smartphone, or group of smartphones.

To register a two dimensional data matrix code for use, the customer would digitally photograph or scan the decal, etc. and transmit the image to the remote processing location. The user would then be prompted to associate the image with desired credit card particulars, including name of card, name of user, credit card number, expiration date, and csv number. The decal could then be affixed to a blank carrier, as in FIG. 5, their driver's license or other identity card, or attached to the corresponding credit card or a rewards card.

Figure 6:
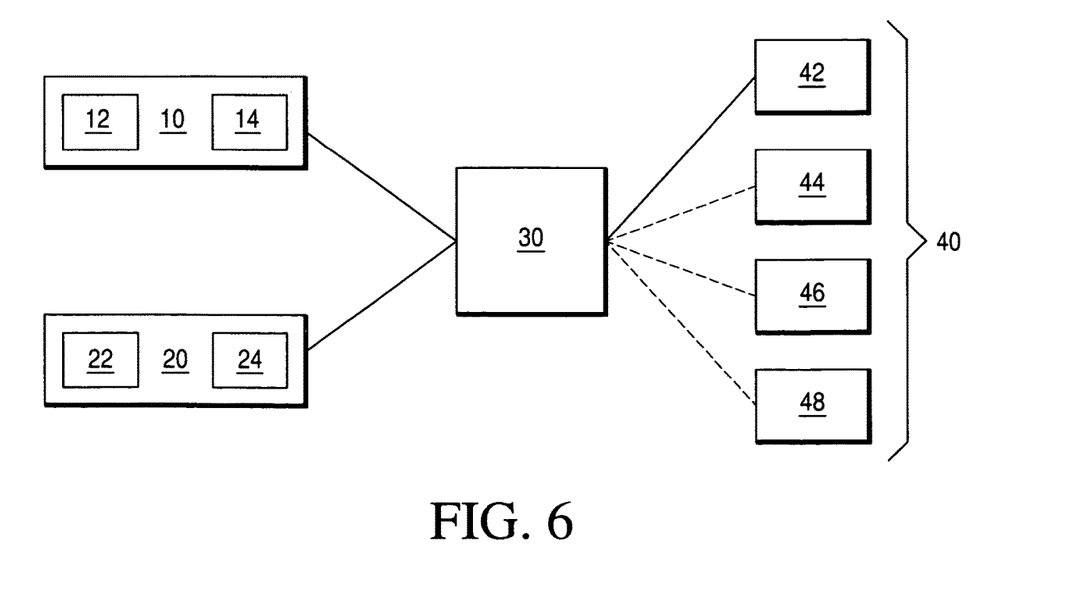
FIG. 6 illustrates by box diagram the communication nodes and pathways employed in an embodiment of the invention.

One embodiment illustrating use of the One Card system is illustrated in FIG. 6. A seller 10 is provided with a smartphone 12 and a decal, stamp, sticker or like 14 embodying a barcode such as a two dimensional data matrix code. A buyer 20 wishing to conduct a sales transaction with the seller is provided with a smartphone 22 and a decal, stamp, sticker or like 24 embodying a barcode such as a two dimensional data matrix code. Both the seller and the buyer are connectable to a remote location 30 which provides transaction control via communication pathways provided by smartphone system coverage, for example. The remote location is connectable via secure communication pathways to credit and/or debit card payment centers 40, for example, Visa payment center 44, MasterCard payment center 46, or Discover payment center 48, or an electronic payment systems company 42, for example, PayPal, which can effect indirect communication between the seller and the payment center.

Figure 7:
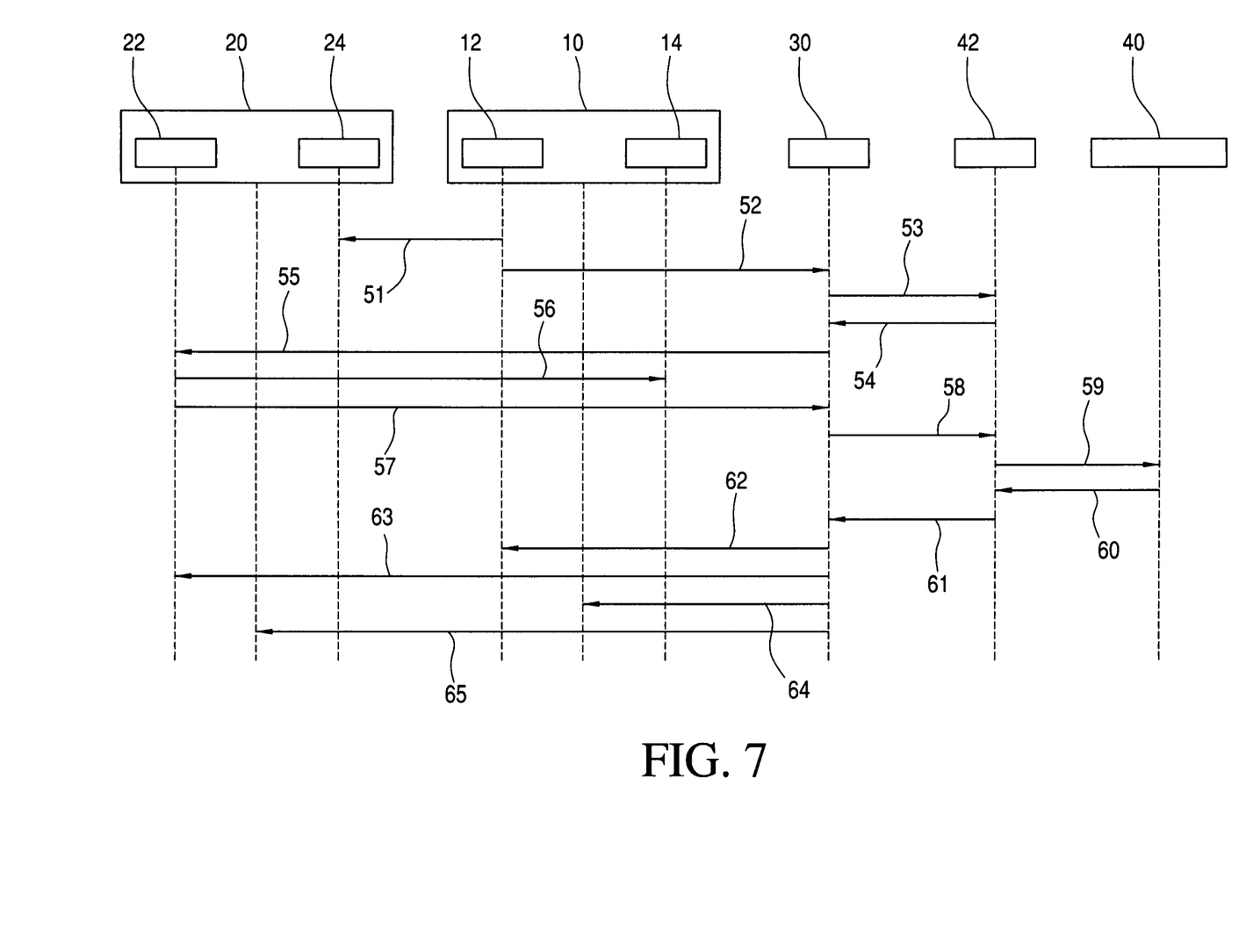
FIG. 7 illustrates schematically the transmissions of electronic information in accordance with an embodiment of the invention.

FIG. 7 schematically illustrates a method for completing a sales transaction between a buyer 20 having a smartphone 22 and a seller 10 optionally having a smartphone 12. The buyer's smartphone has a digital camera function, an interactive display, and is provided with applications software to enable steps of the method which are carried out at the buyer's smartphone.

According to the method an amount to be charged for the sales transaction is established. Usually, it is the seller who establishes this, for example, by scanning the items to be sold. The seller then optically captures buyer data code from the buyer at 54. Preferably, this is done by scanning the buyers decal 24 which encodes the data. The buyer data code and the amount to be charged are then transmitted over a communication pathway, for example, at 25 to a remote location 30, such as over a cell phone grid. The location 30 provides necessary computer and software support to control the sales transaction.

At the remote location, the buyer data is associated with contact information for the buyer in an electronic database. The contact information includes the buyer's smartphone number. Information representative of the amount to be charged is transmitted to the buyer's smartphone display at 55.

The buyer captures the seller's data from the seller with the buyer's smartphone camera function. Preferably, this is accomplished by the buyer scanning the seller's decal 14 at 56. The buyer also inputs payment data using the buyer's smartphone display function, for example, a credit card selected for payment, and transmits from the buyer's smartphone, at 57, the seller data together with the payment data information to the remote location.

The remote location transmits at 58 a payment request from the remote location to a payment center 42 and receives back an approval (or declination) at 61. The approval or declination is transmitted to the buyers smartphone at 63 and to the seller at 62.

Preferably, the buyer data is embodied in a two-dimensional data matrix code and the two dimensional data matrix code is embodied in a square pattern and is printed on thin substrate selected from a decal, stamp or sticker. The thin substrate is preferably carried on a plastic card or other object, preferably an object other than the buyer's smartphone.

The step of optically capturing buyer data from the buyer is preferably carried out by the seller after activating a software application for enabling the method steps carried out by the seller. Prior to the step of the buyer inputting the buyer's payment data, the method preferably comprises electronically fetching predetermined payment option data for the buyer at 53 and transmitting the payment option data to the buyer's smartphone display as at 54. The payment option information can be obtained from a remote information repository for such information maintained by a electronic payment systems company 42 such as PayPal. The payment options are preferably displayed on the buyer's smartphone display function and the buyer indicates their selection using the touchscreen functionality of the smartphone.

Preferably, the seller data, also, is embodied in a two dimensional data matrix code and the smartphone decodes the matrix to obtain the seller data transmitted together with the payment data. This information is preferably received at the payment center 42 which requests authorization for payment at 59 from a credit card center 40 and receives back an authorization (or declination) at 60.

If desired, receipts for the transaction can be transmitted from the remote site to the seller at 64 and to the buyer at 65.

One embodiment of the invention is further illustrated by the following example.

EXAMPLE

Suppose a traveler wants to go on a cruise. They receive a calendar page 2 from their bank (or any other financial institution that facilitates electronic transactions) that has pre-printed temporary tattoos 4, say, as part of a calendar. See FIG. 1. These could either be based on the customer's selection, or, alternatively, the customer could develop their own tattoo designs at home and then submit their own design(s) to the bank to be included in the preprinted calendar.

Figure 1:
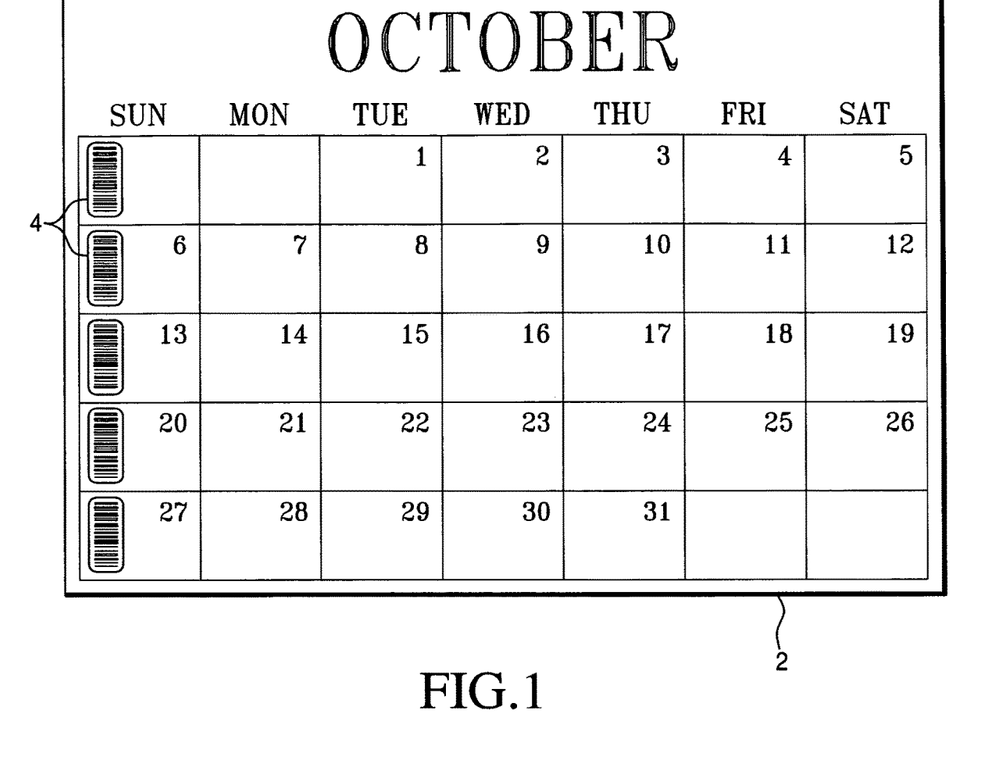
FIG. 1 is a pictorial illustration of a calendar page embodying certain features of an embodiment of the invention.

The traveler simply peels the given tattoo off for the preselected days for which he or she will be using it, and then puts the tattoo on a scannable part of their body, for example, their arm 6, or on a card, for example, a photo-ID such as their driver's license, or their passport. Suppose the traveler has selected "weekly" security. In that case, they would change tattoos (and thereby security codes, or access codes) once per week according to a predetermined schedule. The traveler then logs into a terminal to book the reservation either from home or in the offices of a travel agent.

The computer scan verifies that the tattoo code is for that person, and that it is being used during an authorized time period. Once the data has been verified, they make the purchase and have their preferences, such as meal preferences, registered based on the tattoo. The temporal tattoo system provides more security than credit cards because the information is changed with a relatively high degree of frequency at a very minimal cost as compared to issuing a new credit card. Typically, new credit cards are issued at intervals from one to three years for a given customer unless the customer reports some kind of irregularity for which the customer has the burden to discover and report.

Figure 2:
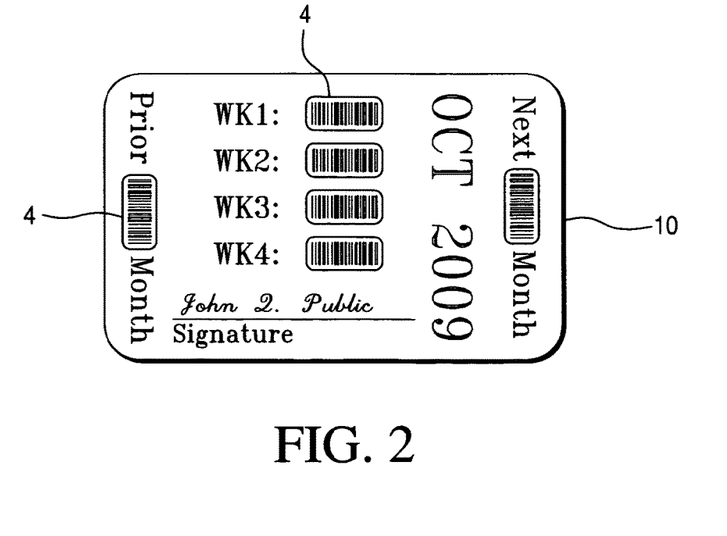
FIG. 2 is a pictorial illustration of a card embodying certain features of an embodiment of the invention.
Figure 3:
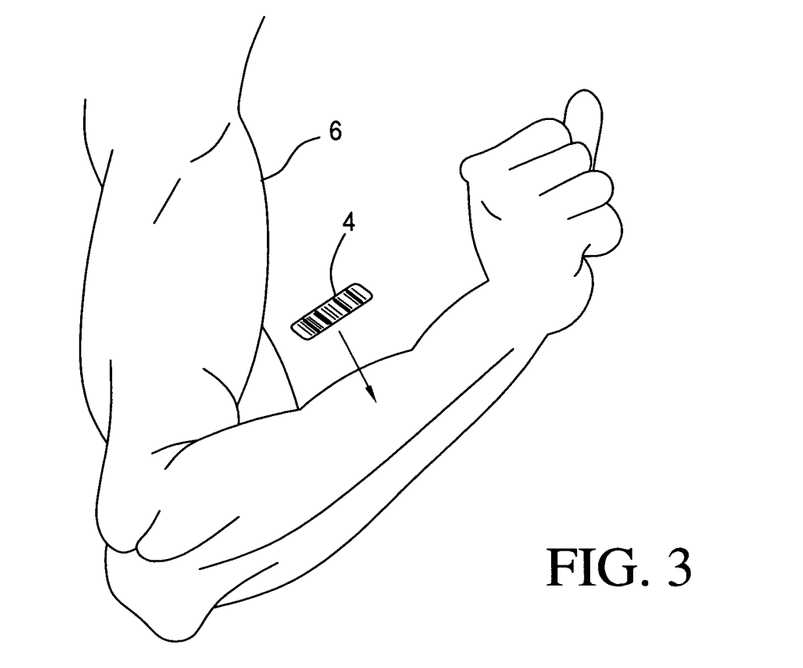
FIG. 3 is a pictorial illustration showing a temporary tattoo being applied to a user in accordance with an embodiment of the invention.
Figure 4:
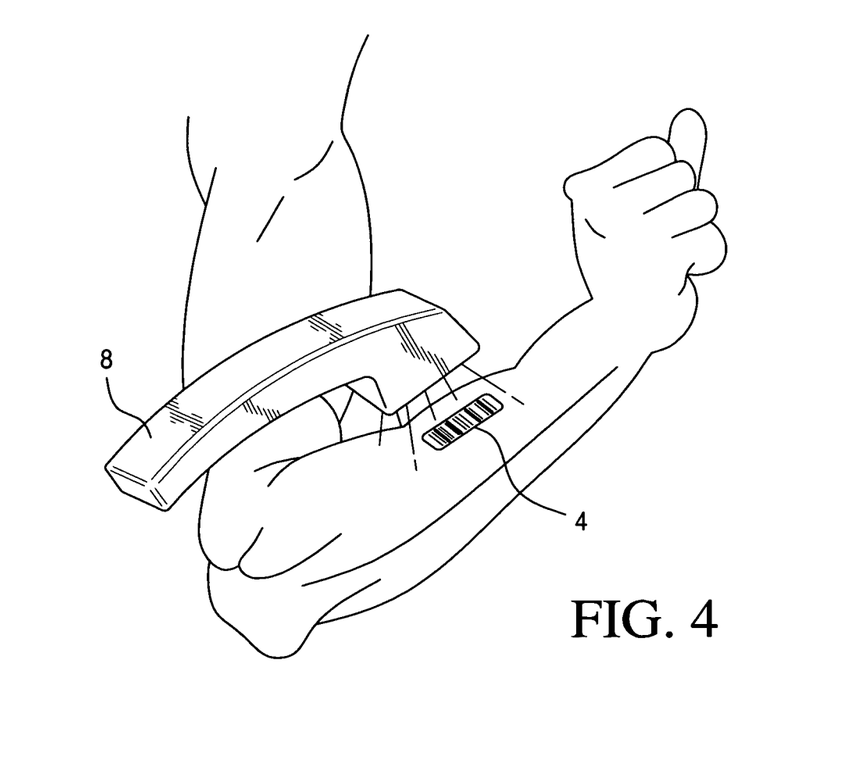
FIG. 4 is a pictorial illustration showing a temporary tattoo being scanned while on a user in accordance with an embodiment of the invention.

To make a purchase, the user has the mark scanned by scanner 8 and the information is transmitted to a database for confirmations and approval. If desired, a series of tattoo codes could be provided on a credit card sized (about 85×54 mm) card 10 which could be transferred to the user or read directly from the card.

The invention claimed is:

1. A method for confirming payment authorization comprising the steps of:

providing in an electronic database, electronically accessible from a processing center, a person's financial account information data;

providing in the same electronic database as the person's financial account information data or in a different electronic database electronically accessible from the processing center, stored scannable image data for each of a plurality of scannable graphic images, each said scannable graphical image comprised of an original graphical image, said original graphical image containing at least one pattern of altered pixels forming a binary code readable with an appropriate scanner, with said pattern of altered pixels not being apparent to consumers or other persons not having prior knowledge of the location or nature of the pattern of altered pixels, with said pattern of altered pixels being independent of the shape of any machine-readable patterns contained within the original graphical image which are apparent to consumers or other persons without needing additional information, said at least one pattern of altered pixels being altered in such a way to yield a data string when scanned, with the stored scanned image data including the at least one data-string-yielding pattern of altered pixels for each scannable image associated with the person's financial account information data in a validating way by validating each scannable image for use during a specific predetermined period of time;

displaying one of said plurality of scannable images from the person's appendage or an associated personal object during the specific time period;

electronically scanning the displayed scannable image;

electronically transferring the scanned image to the processing center;

and confirming electronically from the time, the person's financial account information data, and stored scanned image data for the plurality of scannable images whether the scanned image is currently validated for use to authorize a payment from the person's financial account.

2. A method as in claim 1 wherein the scanned image is determined to be validated for use by associating the person's financial account information data with the scanned image data during the specific time period.

3. A method as in claim 1 further comprising approving a financial transaction for the person in response to a determination that the scanned image is validated for use.

4. A method as in claim 3 wherein the scannable image comprises a temporary tattoo, label, sticker, or other scannable design which yields a data string.

5. A method as in claim 3 wherein the scannable image comprises a label, sticker or decal of a barcode or other scannable design which yields a data string.

6. A method as in claim 3 further comprising debiting an account of the person in the amount of the financial transaction.

7. A method for debiting a person's financial account for a purchase transaction, said method comprising establishing a person's authority to make purchase transactions, providing in an electronic database, financial account information for the person, providing the person with a plurality of differing scannable images each comprised of an original graphical image, said original graphical image containing at least one pattern of altered pixels, said at least one pattern of altered pixels not being apparent to consumers or other persons not having prior knowledge of the location or nature of the pattern of altered pixels, with said pattern of altered pixels being independent of the shape of any machine-readable patterns contained within the original graphical image which are apparent to consumers or other persons without needing additional information, said at least one pattern of altered pixels being altered in such a way to yield a data string when scanned that is independent of any machine-readable codes that are apparent to consumers or other persons without needing additional information contained with the original graphical image, each scannable image suitable for displaying on the person's body or a personal effect, each scannable image authorizing the person to enter purchase transactions during an assigned specific predetermined temporary time period, the plurality of scannable images covering a plurality of differing specific predetermined temporary time periods, providing in the same electronic database as the financial account information for the person or in a different electronic database accessible to the processing center, electronic counterparts for each of the plurality of scannable images, and respective assigned specific predetermined temporary time periods for use, each scannable image being validated for use to make a purchase only during its respective assigned specific predetermined temporary time period;

displaying one of said plurality of scannable images from the person's body or personal object during its assigned specific temporary time period for the purpose of making a purchase;

electronically scanning the displayed scannable image;

electronically transferring the scanned image to the processing center;

determining electronically from the time, the scanned image, and the assigned specific time period for use of the scanned image, whether the scanned image is validated for use, and electronically debiting the person's financial account in response to a determination that the scanned image is validated for use.

8. A method for debiting a person's financial account for a purchase transaction, said method comprising establishing a person's authority to make purchase transactions, providing in an electronic database, financial account information for the person, providing the person with a scannable image comprised of an original graphical image, said original graphical image containing at least one individually altered pixel, said at least one individually altered pixel not being apparent to consumers or other persons not having prior knowledge of the location or nature of the at least one individually altered pixel, with said at least one individually altered pixel being independent of any machine-readable patterns contained within the original graphical image which are apparent to consumers or other persons without needing additional information, said at least one individually altered pixel being altered in such a way to yield a data string when scanned that is independent of any machine-readable codes that are apparent to consumers or other persons without needing additional information contained with the original graphical image, the scannable image suitable for displaying on the person's body or a personal effect, displaying the of scannable image from the person's body or personal object for the purpose of making a purchase;

electronically scanning the displayed scannable image;

electronically transferring the scanned image to the processing center;

determining electronically from the scanned image, whether the scanned image is validated for use, and electronically debiting the person's financial account in response to a determination that the scanned image is validated for use.

\* \* \* \* \*